Patented Dec. 18, 1923.

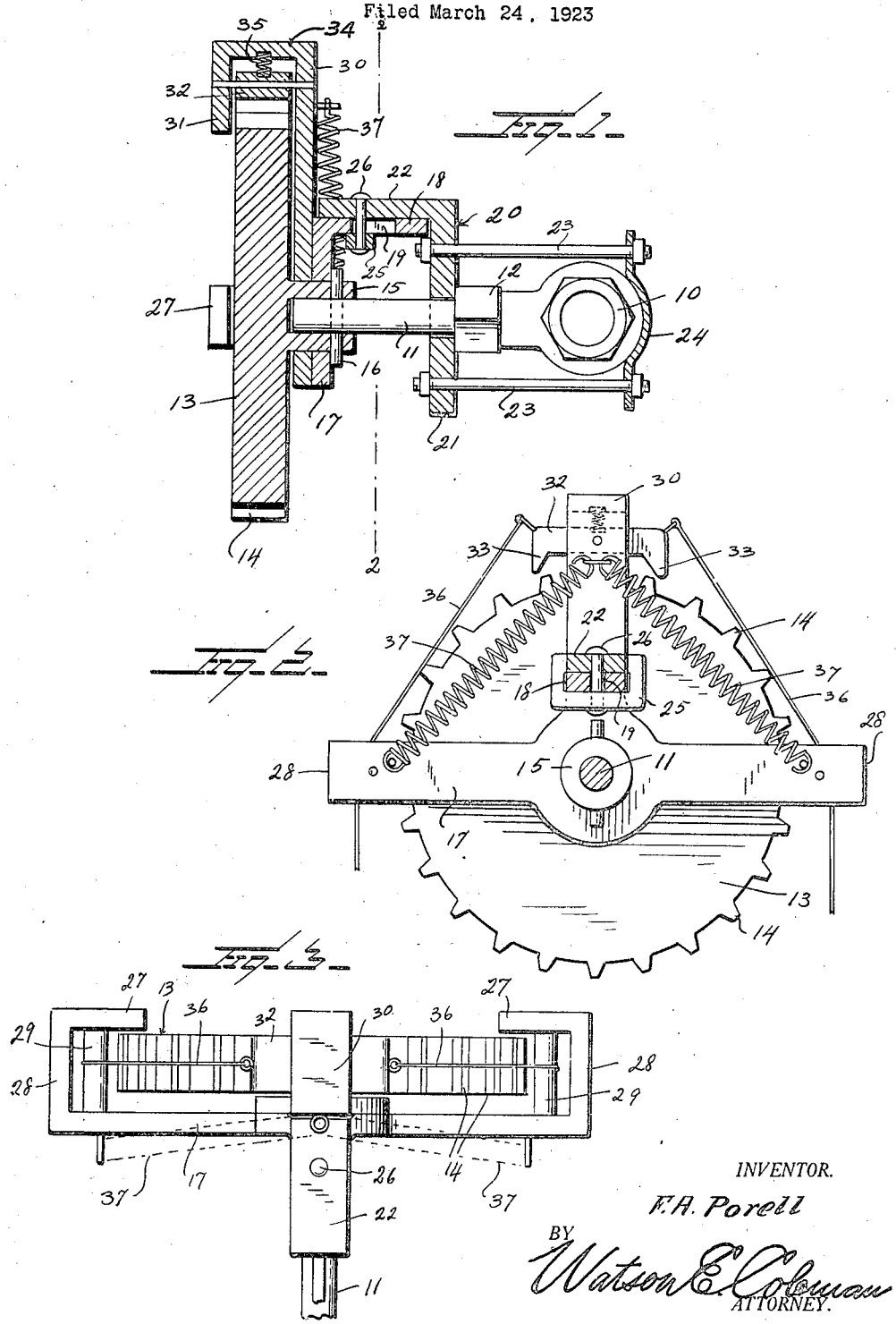

1,477,897

UNITED STATES PATENT OFFICE.

FRANK A. PORELL, OF SANFORD, MAINE.

VALVE-OPERATING MECHANISM.

Application filed March 24, 1923. Serial No. 627,382.

*To all whom it may concern:*

Be it known that I, FRANK A. PORELL, a citizen of the United States, residing at Sanford, in the county of York and State of Maine, have invented certain new and useful Improvements in Valve-Operating Mechanism, of which the following is a specification, reference being had to the accompanying drawings.

This invention relates to valve operating mechanism and more particularly to the means for manually operating valves from a remote point.

An important object of the invention is to provide means of this character, including an operating mechanism by means of which a valve is rotated to open or close the same, through the agency of reciprocatory flexible elements, in order to prevent the burning of the hands that is common when chain wheels are employed for the operation of the valve.

A further object of the invention is to provide a device of this character which may be readily applied to a valve and which when applied thereto may be operated from any desired point.

A still further object of the invention is to provide a device of this character which is simple in its construction, and arrangement, durable in service and a general improvement in the art.

These and other objects I attain by the construction shown in the accompanying drawings, wherein for the purpose of illustration I have shown a preferred embodiment of my invention and wherein:—

Figure 1 is a vertical sectional view showing valve operating mechanism constructed in accordance with my invention applied to a valve;

Figure 2 is a section on the line 2—2 of Figure 1; and

Figure 3 is a plan view of the operating mechanism.

Referring now more particularly to the drawings, the numeral 10 indicates the body of a steam valve or the like, 11 the operating stem of the valve and 12 the packing nut of the operating stem. In accordance with my invention I secure to the stem 11 of the valve a disk 13, provided upon its periphery with spaced gear like teeth 14, the disk having a hub portion 15 into which the stem extends and through which the securing element 16, maintaining the stem in fixed relation to the disk, is directed in spaced relation to the disk 13.

The numeral 17 indicates a bridge member rotatably receiving at its central portion the hub 15 of the disk 13 intermediate the disk and the securing element 16. This bridge member embodies a right-angular flange 18 directed toward the valve and having a slot 19 formed therein. The numeral 20 designates an angle arm composed of right-angularly disposed sections 21 and 22. The section 21 of the angle arm has formed therein an opening rotatably receiving the stem 11 of the valve and adapted to abut the packing nut 12 thereof. Through this arm are directed bolts 23, adapted to extend at opposite sides of the valve body 10 and to engage with their lower ends a strap 24, engaging the opposite side of the valve body from the stem and firmly securing the angle arm 20 thereto. It will be obvious that the method of attaching the angle arm just described is but one of many forms which may be employed. The other section 22 of the angle arm slidably abuts the face of the flange 18 remote from the valve stem 11 and includes a yoke 25 embracing this flange. Through the yoke and section 22 a pin 26 is directed, extending through the slot 19 of the flange 18, thus connecting these sections together to permit movement of the bridge member 17 and flange 18 thereof toward and away from the valve in alignment with the valve stem and thus compensating for the movement of the valve stem as the valve opens or closes.

The ends of the bridge member are reverted to form guide arms 27, extending over the edges of the disk at opposite sides thereof, the bight portions 28 connecting these guide arms to the bridge member proper being in spaced relation to the periphery of the disk. Between the periphery of the disk and the adjacent bight portion 28, rollers 29 are pivotally mounted between the bridge member 17 and the arms 27, for purpose presently to appear. Mounted for oscillation upon the hub 15 of the disk 13, intermediate the bridge member 17 and the disk, is an operating arm 30, the end of which is extended beyond the periphery of the disk and reverted to form a third guide arm 31. The bight portion connecting the operating arm 30 and guide arm 31 is in spaced relation to the periphery of the disk and the operating arm and guide arm 31 combine to form a pivotal mounting for a compound dog 32, comprising a bar pivoted at its center and provided at each end with a tooth 33, directed toward the periphery of the disk. Between the bight portion 34 and the bar extends a spring 35 secured to the bight portion and to the bar and normally maintaining this bar in substantial parallelism to the bight portion, in which position its teeth 33 are free from engagement with the teeth 14 upon the periphery of the disk. To each end of the bar forming the dog, a flexible element 36 is secured which is trained about the roller 29 at the corresponding side of the bridge member 17. It will be seen that upon a pull being exerted upon one or the other of these flexible elements the corresponding end of the dog bar will be depressed toward the periphery of the disk, so that its tooth 33 will engage the teeth on the periphery of the disk and cause rotation of the disk. As a means for returning the operating arm to proper position a pair of coil springs 37 are secured to this operating arm adjacent the free end thereof and have their opposite ends secured to the bridge member 17 at opposite sides of the hub 15 and in spaced relation to the hub.

The flexible elements 36 may be continued to any desired point and which at the point may be provided with suitable operating handles not herein disclosed. Upon engagement with one of these operating handles, to exert a pull upon the flexible element 36 the disk will be rotated in a direction to close the valve, the operating arm oscillating toward one end of the bridge member 17. This oscillation will cause a tension of one of the springs 37, with the result that when the flexible element is released the operating arm will be returned to its normal position. During this return to normal position the spring 35 will act to return the dog to its normal position. By repeated pulls upon this element the valve may be closed. Correspondingly by repeated pulls in the opposite direction the valve stem will be rotated in the opposite direction and the valve will be opened. While I have herein described this specific construction by means of which operation of the valve is attained and a specific means of attaching the operating mechanism to the valve, it will be understood that the construction hereinbefore set forth is capable of some modification without departing from the spirit of my invention and I accordingly do not limit myself to such specific structure, except as hereinafter claimed.

I claim:—

1. In valve operating mechanism, a toothed disk adapted for attachment to the stem of a valve, a bridge member connected with the valve body to be withheld from rotation with relation thereto and with the disk for movement toward and away from the valve body with the disk, an operating arm rotatable upon the disk and having a compound dog for engagement with the teeth thereof, means normally maintaining said dog out of engagement with the teeth, an elastic connection between the operating arm and the bridge member, normally maintaining the operating arm in a position intermediate the ends of the bridge member and flexible connections with said dog for simultaneously engaging said dog with the teeth of the disk to rotate the disk in one direction or the other upon oscillation of the arm and for oscillating the arm in such direction against the action of the elastic connection.

2. In valve operating mechanism, a toothed disk adapted for attachment to the stem of a valve, an arm pivoted axially of the disk, elastic means normally holding the arm in one position with relation to the valve, a pivoted member carried by the arm and provided at opposite ends thereof with teeth for engagement with the teeth of the disk, a spring maintaining the teeth of said member out of engagement with the teeth of the disk and connections with opposite ends of said member each adapted when shifted longitudinally in one direction to initially engage the tooth at the corresponding end of the member with the teeth of the disk and subsequently oscillate the arm upon its pivot to thereby rotate the disk.

3. In valve operating mechanism, a disk provided upon its periphery with teeth and having a hub adapted for attachment to a stem of a valve, a bridge member connected with the valve body to be withheld from rotation with relation thereto and with the disk for movement toward and away from the valve body with the disk, an operating arm rotatable upon the hub of the disk, a bar pivoted intermediate its ends upon the free end of the arm and having at its ends teeth engageable with the teeth upon the disk, means engaging said bar and arm normally mounting the teeth of the bar out of engagement with the teeth of the disk, elastic connections between the operating arm and the bridge member normally maintaining the operating arm substantially perpendicular to the bridge member and flexible elements connected with said dog at each end thereof.

4. In valve operating mechanism, a disk provided upon its periphery with teeth and having a hub adapted for attachment to a stem of a valve, a bridge member connected with the valve body to be withheld from rotation with relation thereto and with the disk for movement toward and away from the valve body with the disk, an operating arm rotatable upon the hub of the disk, a bar pivoted intermediate its ends upon the free end of the arm and having at its ends teeth engageable with the teeth upon the disk, means engaging said bar and arm normally mounting the teeth of the bar out of engagement with the teeth of the disk, elastic connections between the operating arm and the bridge member normally maintaining the operating arm substantially perpendicular to the bridge member and flexible elements connected with said dog at each end thereof and guiding rollers carried by opposite ends of said bridge member and about which said flexible elements are trained.

In testimony whereof I hereunto affix my signature.

FRANK A. PORELL.